United States Patent [19]
Kirkpatrick

[11] 3,950,653
[45] Apr. 13, 1976

[54] INSTRUMENT FOR SENSING LEVEL OF GRANULAR MATERIALS
[75] Inventor: William J. Kirkpatrick, Davenport, Iowa
[73] Assignee: Agridustrial Electronics, Inc., Bettendorf, Iowa
[22] Filed: Jan. 24, 1975
[21] Appl. No.: 543,674

[52] U.S. Cl............ 307/116; 73/304 C; 317/249 R
[51] Int. Cl.² ...................................... H01H 35/00
[58] Field of Search..... 317/101 R, 101 DH, 249 R; 73/304 C; 324/60 R; 307/116

[56] References Cited
UNITED STATES PATENTS
| 2,541,897 | 2/1951 | Wadsworth | 317/249 R |
| 3,062,994 | 11/1962 | Mesh | 73/304 C |
| 3,638,491 | 2/1972 | Hart | 73/304 C |

Primary Examiner—David Smith, Jr.
Attorney, Agent, or Firm—Glenn H. Antrim

[57] ABSTRACT

A cylindrical housing contains both a circuit board and a pair of capacitive sensing electrodes. The pair of electrodes are adjacent the inside wall near an end that is to be wholly or partly covered with granular material in a container. Since an electric field is relatively concentrated about the electrodes, compared with the divergent field about the type having a single protruding electrode and depending on external ground planes, the circuits of the instrument show presence of material repeatedly quite close to a predetermined level. The unitary construction affords protection and permits the capacitive sensing electrodes to be mounted on the circuit board over a printed circuit tab.

5 Claims, 6 Drawing Figures

INSTRUMENT FOR SENSING LEVEL OF GRANULAR MATERIALS

BACKGROUND OF THE INVENTION

This invention relates to capacitive proximity instruments and particularly to instruments having both circuit boards and capacitive electrodes within closed dielectric housings.

Proximity type of instruments are adapted to be installed in containers for providing control or warning signals in response to material closely approaching or surrounding sensing elements of the instruments. By placing different sensing elements at different predetermined levels in containers or bins, signals for indication or control are provided in response to materials within the containers having reached the respective levels.

Certain prior instruments are used namely for granular materials. For example, one type has paddles placed in grain bins. When the paddles are above the level of grain, they are rotated freely by low-torque motors, but when the grain reaches the level of each paddle in succession, the paddles are stopped by the grain restraining their rotation. Signal means are operated in response to the stopping of motors to which the paddles are connected.

A prior capacitive type of level measurement equipments have probes that are single electrodes extending a short distance inwardly from mounting positions in the walls of bins. Adjacent each probe, the lines of force of an electric field extend outwardly from the probe and bend toward a conductive mounting base or to the adjacent wall of the bin in which the probe is placed. As a material having substantially greater dielectric constant than air comes with the field, the capacitance of the probe increases sufficiently to cause an output from the circuits to which it is connected. Since the effective field is spread over quite a large space about a probe of this type, and since the probe may need to be substantially covered by material before obtaining output indication, sufficient sensitivity is not obtained to detect precisely when a predetermined level has been reached. For example, A. Edelman et al in U.S. Pat. No. 2,774,959 issued on Dec. 18, 1956 teach the use of a single rugged probe suitable for sensing the level of heavy agglomerate materials.

SUMMARY OF THE INVENTION

To confine the electric field about the probe, the probe contains two comparatively closely spaced electrodes that are both preferably spaced quite far from a ground plane such as the wall of the container for material or the mounting base of the instrument. As material rises to the level of the probe, the level to obtain a significant change in capacitance of the probe, is quite sharply defined. The level at which the circuits connected to the probe will operate, can even be changed somewhat by rotating the probe for different orientation of its electrodes. Outside the immediate area of the capacitive electrodes, the existence or position of a ground plane has little effect on operation of the circuits.

In a preferred embodiment, each of the electrodes is a strip of spring material fastened directly to the end of a circuit board containing the instrument's circuitry. The circuit board is inserted in a cylindrical, dielectric housing, the end having the electrodes being inserted first. Before inserting the circuit board, the electrodes are tensioned outwardly in an arcuate shape, and after the electrodes on the circuit board are compressed to a smaller diameter and inserted, they are urged outwardly against the inside wall near the closed end of the housing. For mounting, the housing is either turned into a conductive base that is normally at ground potential while mounted on the wall of a bin or the housing is suspended from a cable into the bin. The housing protects both the capacitive electrodes and the circuit board. Obviously, usual leads connecting the capacitive electrodes to the circuit board are eliminated for the electrodes are connected directly to printed circuitry to keep distributed capacitance minimum and to provide maximum sensitivity of the instrument.

DESCRIPTION OF THE PREFERRED EMBODIMENT

Figure 1:
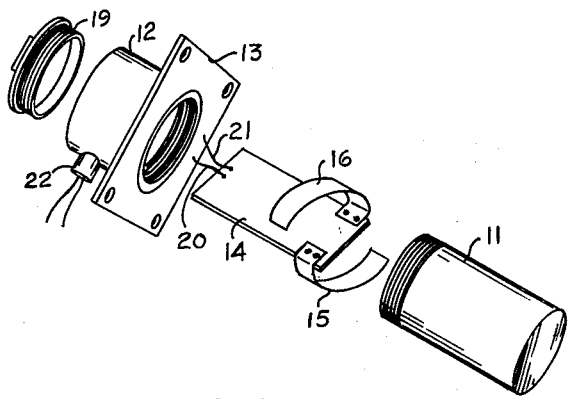
FIG. 1 is an exploded, perspective view of the probe assembly of this invention.
Figure 2:
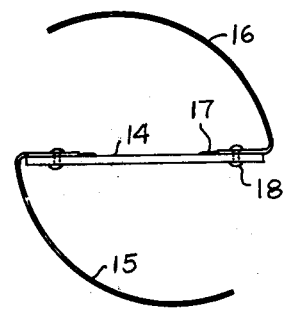
FIG. 2 is an end view of the capacitive electrodes and the circuit board.

As shown in FIG. 1, the present probe assembly of a proximity system suitable for measuring level of grain in bins comprises a dielectric cylinder or housing 11, an end cap 12 with a mounting flange 13, a rectangular circuit board 14 having a width slightly less than the inside diameter of the cylinder 11, and a pair of arcuate capacitive electrodes 15 and 16 fabricated from conductive spring material and secured over printed circuit tabs on an end of the circuit board 14. Before assembly, the housing 11 has a closed end and an opposite open end. As shown in FIG. 2, one end of each of the electrodes 15 and 16 is fastened to the end of the printed circuit board 14 over printed circuit tabs 17 by eyelets 18. The ends of the electrodes 15 and 16 are in contact with respective printed circuit pads 17 mounted near opposite edges of the circuit board 14, and the electrodes 15 and 16 are curved outwardly from the circuit board 14 in the same circular direction, but over opposite faces of the circuit board 14. The length of each of the electrodes is such that when it is compressed within the dielectric housing 11, it is somewhat too short to make a full semi-circle. The electrodes 15 and 16 may be fabricated from strips of spring brass or phosphor bronze, and before being inserted in the cylinder 11, the radius of curvature of each of the electrodes 15 and 16 is somewhat greater than that of the inside surface of the cylinder 11.

Figure 3:
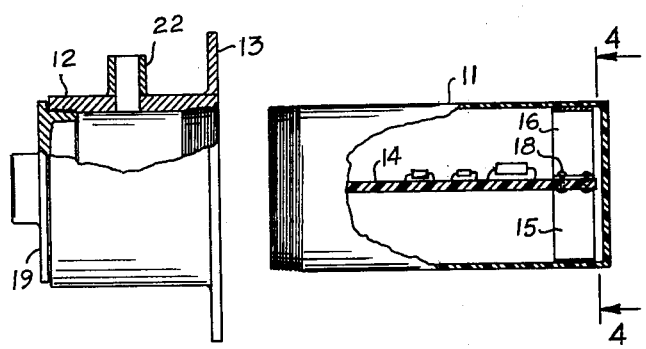
FIG. 3 is a partial longitudinal cross-sectional view of the probe assembly including the mounting means of FIG. 1.
Figure 4:
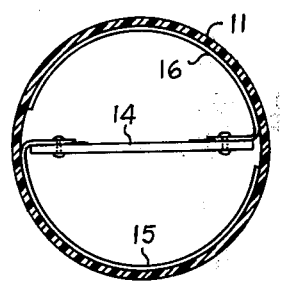
FIG. 4 is a lateral cross-sectional view of the assembled probe assembly taken near the closed end of the assembly.

The circuit board 14 and the attached capacitive electrodes 15 and 16 have the positions in the assembled probe as shown in FIGS. 3 and 4. The conductive strips that make up the capacitive electrodes 15 and 16 are compressed until they define a circle with a diameter slightly smaller than the inside diameter of the dielectric housing 11, and then the circuit board 14 is inserted in the housing 11 to position the capacitive electrodes 15 and 16 within that portion of the inner wall near the closed end of the housing 11. Since the width of the circuit board 14 is only slightly less than the inside diameter of the housing 11, the wall of the housing supports the circuit board in a diametrical position. The interior of the housing 11 is filled with polyurethane foam or polyether foam to seal the assembly and to hold the circuit board 14 and the electrodes 15 and 16 firmly in place. The cylindrical housing 11 has outside threads about its open end to be turned into threads inside the end cover 12 adjacent the flange 13. The opposite end of the end cover 12 is normally closed by a threaded pipe plug 19. This plug is removed while the housing 11 is being turned into the end cover 12 to facilitate guiding the flexible connecting leads 20 and 21 (FIG. 1). The connecting leads 20 and 21 are the power and output connections extending from the circuit board 14, and after the housing 11 is assembled to the cap 12, the flexible leads 20 and 21 are connected to an electrical connector 22 mounted in the wall of the cover 12. To complete the assembly, the pipe plug 19 is turned into that end of the cover 12 opposite the housing 11.

Figure 5:
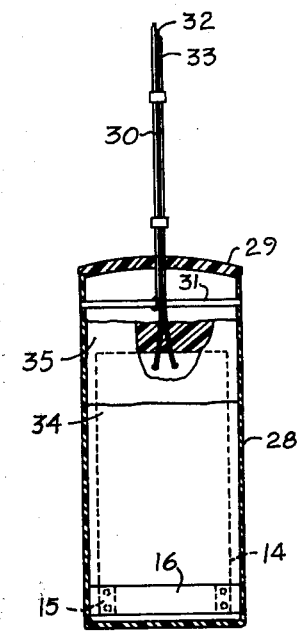
FIG. 5 is a longitudinal cross-sectional view of the probe assembly with a cable support rather than a wall support shown in FIG. 1.

Rather than using an end cover 12 of FIG. 1 to mount the probe assembly to the wall of a bin, a different type cover as shown in FIG. 5 may be used, and the probe assembly supported by a cable. Through the use of a cable, the probe assembly may be readily positioned at any desired height within a bin.

In FIG. 5, the circuit board 14 and its capacitive electrodes 15 and 16 are mounted within a cylindrical, dielectric housing 28. The housing 28 is similar to the housing 11 of FIG. 1 except the end for a cover 29 is not threaded and may extend somewhat farther beyond the end of the circuit board 14. The cover 29 of dielectric material is a disk of the required size to fit over one end of the housing 28; preferably, the disk has a slight crown as shown.

As previously described, the circuit board 14 and the capacitive electrodes 15 and 16 are inserted in the housing 28. For securing a cable 30, a rod or bar 31 is secured diametrically across the housing 28 near its open end. An end of the cable 30 is secured to the rod 31 and two long connecting leads 32 and 33, that correspond to the short leads 20 and 21 of FIG. 1, are connected to the circuit board 14. Pieces of tape may be placed about the cable 30 and the leads 32 and 33 as required to form a single cable.

After the cable 30 and leads 32 and 33 are connected, approximately the lower two-thirds of the housing 28 is filled with foam that has low dielectric properties such as polyether foam 34, and the remaining upper portion near the open end is filled with casting resin 35 having suitable dielectric properties, good strength, and high resistance to moisture. The cable 30 and leads 32 and 33 are next threaded through a central opening in the cover 29, and the cover is cemented to the end of the housing 28.

Figure 6:
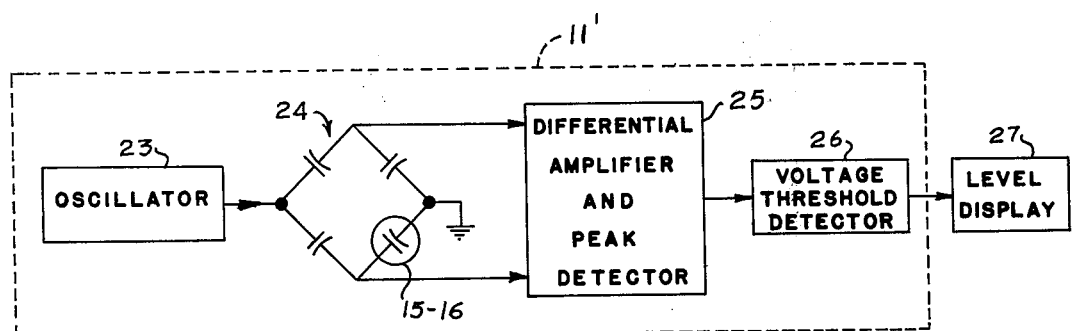
FIG. 6 is a block diagram of indicator circuits using the probe assembly.

In FIG. 6, circuits enclosed by the dash line 11' are the circuits contained within the housings of FIGS. 1, 3, and 5. A preferred circuit includes an oscillator 23 having its output connected to a capacitive bridge circuit 24. One of the capacitors in the four branches of the bridge circuit 24 comprises the capacitive plates 15 and 16 mounted within the housing 11 of the probe. The ends of the diagonal of the bridge 24 opposite to the diagonal that is connected to the output of the oscillator 23, are connected to different inputs of a differential amplifier contained within the block 25. The circuits of the block 25 also include a peak detector to provide an output d-c voltage proportional to the difference voltage appearing across that diagonal of the bridge 24 connected to the inputs of the differential amplifier 25.

Usually the bridge 24 is adjusted until zero voltage appears at the output of the differential amplifier and peak detector 25 while the end of the housing 11 containing the electrodes 15 and 16 is exposed. When material flows about the housing 11, the capacitance of the capacitor comprising the electrodes 15 and 16 increases to unbalance a bridge and thereby to cause an output from the peak detector within the block 25. The output of the peak detector is connected to the input of a voltage threshold detector 26. As the output of the peak detector reaches a predetermined value, the voltage threshold detector 26 operates to provide a substantial change in current over the leads 20 and 21 of FIG. 1 or leads 32 and 33 of FIG. 5 that are connected to a remote level display 27. The use of two leads for supplying both power and output signal is described in U.S. patent application Ser. No. 531,591 filed by William J. Kirkpatrick et al on Dec. 11, 1974 and assigned to the assignee of this application. In this circuit, a Schmitt trigger circuit rather than a linear circuit is used in the final stage. The level display 27 operates to indicate that material has reached the level at which the housing 11 is surrounded.

Since the lines of electric field are confined quite closely to the end of the container and especially to the surface of the container near the ends of the capacitive electrodes 15 and 16, the sensitivity of the sensing probe of this invention is affected a minimum amount by ground planes within its vicinity and particularly with respect to the plane on which the base of the probe is mounted. Also, because of the confinement of the field, the level measuring system of this invention does not have to be critically calibrated for determining level within quite close limits. The exact level at which electrical output is obtained from electrical circuits can even be changed somewhat by the rotational position of the housing 11 of FIG. 1. For example, if the capacitive electrode 15 is positioned below the electrode 16, and 15 is the electrode at ground potential, a level to be detected is somewhat higher than if the electrode at ground plane is in the upper position occupied by the electrode 16. In installations in elevators, the orientation of the housing for placing the common or ground electrode 15 in the upper position is advantageous. Since the upper electrode 15 functions as a shield for external material, an accumulation of material or the roosting of bird on the upper portion of the housing is not detected by the probe. Tests show that the probe is most sensitive along the middle portion of the ungrounded capacitive electrode. In an alternate arrangement, the arcuate spring capacitive electrode to be connected to ground might be omitted, and the circuit board be provided with a conductive surface connected in its place to function as a ground plane. Sufficient sensitivity may be obtained for many applications by using only the usual circuits of the board 14 as the grounded electrode. The level detecting system according to this invention will detect the presence of liquids, metals, and granular organic materials except very light and dry materials. Obviously, since the probe is sealed, it is uneffected by dust and moisture; and since the calibration is not critical, it is operable over a wide temperature range.

I claim:

1. A proximity tester particularly adapted to test the levels of materials comprising:
   a closed housing having a perimetrical side wall and an adjoining closed end of dielectric material,
   first and second spaced coextensive capacitive elements, means for mounting said capacitive elements within said perimetrical side wall,
   a circuit board, said circuit board having circuits with respective input terminals connected to said capacitive elements for detecting changes in capacitance therebetween, said first capacitive element and its input terminal being isolated from ground,
   supporting means connected to said housing for positioning said side wall of said housing at a predetermined height within a container to be filled with material, said first capacitive element being an electrode adjacent a portion of the inner surface of said side wall at said adjoining end of said housing, and means for mounting said circuit board securely within said side wall.

2. A proximity tester according to claim 1 in which said first capacitive element is a first strip of conductive spring material, an insulating mounting board, said first strip being secured to said insulating mounting board by attaching one end of said first strip thereto such that said first strip generally extends over one face of said insulating mounting board, said insulating mounting board being mounted within said housing and said first strip having spring tension to urge a substantial portion thereof outwardly against a portion of the inner surface of said side wall.

3. A proximity tester as claimed in claim 2 wherein said second capacitive element is a second strip of conductive spring material, said second strip being attached to said insulating mounting board by attaching one end of said second strip thereto such that said second strip generally extends over the other face of said insulating mounting board, and said second strip having spring tension to urge a substantial portion thereof outwardly against the inner surface of said side wall opposite said first strip.

4. A proximity tester as claimed in claim 3 wherein said insulating mounting board is an end portion of said circuit board.

5. A proximity tester as claimed in claim 4 wherein said housing is cylindrical and said strips of spring material are positioned as a discontinuous ring within said side wall.

* * * * *